(12) United States Patent
Babon et al.

(10) Patent No.: US 10,937,180 B2
(45) Date of Patent: Mar. 2, 2021

(54) METHOD AND APPARATUS FOR DEPTH-MAP ESTIMATION

(71) Applicant: INTERDIGITAL CE PATENT HOLDINGS, Paris (FR)

(72) Inventors: Frederic Babon, Chateaubourg (FR); Benoit Vandame, Betton (FR); Guillaume Boisson, Pleumeleuc (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 112 days.

(21) Appl. No.: 16/233,603

(22) Filed: Dec. 27, 2018

(65) Prior Publication Data
US 2019/0197713 A1    Jun. 27, 2019

(30) Foreign Application Priority Data
Dec. 27, 2017   (EP) .................................. 17306936

(51) Int. Cl.
| | | |
|---|---|---|
| G06T 7/55 | (2017.01) | |
| G06F 17/16 | (2006.01) | |
| G06T 3/40 | (2006.01) | |
| G06T 7/00 | (2017.01) | |
| G06T 7/593 | (2017.01) | |

(52) U.S. Cl.
CPC ............... *G06T 7/55* (2017.01); *G06F 17/16* (2013.01); *G06T 3/4084* (2013.01); *G06T 7/593* (2017.01); *G06T 7/97* (2017.01); *G06T 2207/20052* (2013.01)

(58) Field of Classification Search
CPC .. G06T 7/55; G06T 7/97; G06T 7/593; G06T 2207/20052; G06T 3/4084; H04N 2013/0081; G06F 17/16

USPC .................................................. 382/154, 276
See application file for complete search history.

(56) References Cited

U.S. PATENT DOCUMENTS

| | | | |
|---|---|---|---|
| 8,712,145 B2 | 4/2014 | Baik et al. | |
| 9,208,576 B2 | 12/2015 | Eggert et al. | |
| 9,418,432 B2 | 8/2016 | Bakhtiari et al. | |
| 9,483,830 B2 | 11/2016 | Barone | |
| 2001/0041008 A1* | 11/2001 | Kasutani | G06K 9/522 382/218 |

OTHER PUBLICATIONS

Olofsson, A., "Modern Stereo Correspondence Algortihms: Investigation and Evaluation", Linkoping University, Department of Electrical Engineering, Thesis, Jun. 17, 2010, pp. 1-114.

(Continued)

*Primary Examiner* — Daniel G Mariam
(74) *Attorney, Agent, or Firm* — Invention Mine LLC

(57) ABSTRACT

A method and an apparatus for depth-map estimation between at least two images respectively captured by at least two cameras are disclosed. Extrinsic and intrinsic parameters of the at least two cameras are obtained. Local spatial structure descriptors for each pixel of the at least two images are obtained by transforming a patch of pixels surrounding each pixel, and depth is obtained for at least one pixel of a first image among the at least two images, among at least two depth candidates, each depth candidate being associated with a corresponding pixel in a second image of the at least two images, said corresponding pixel in the second image being determined according to the obtained extrinsic and intrinsic parameters.

17 Claims, 4 Drawing Sheets

(56) References Cited

OTHER PUBLICATIONS

Figure 1:
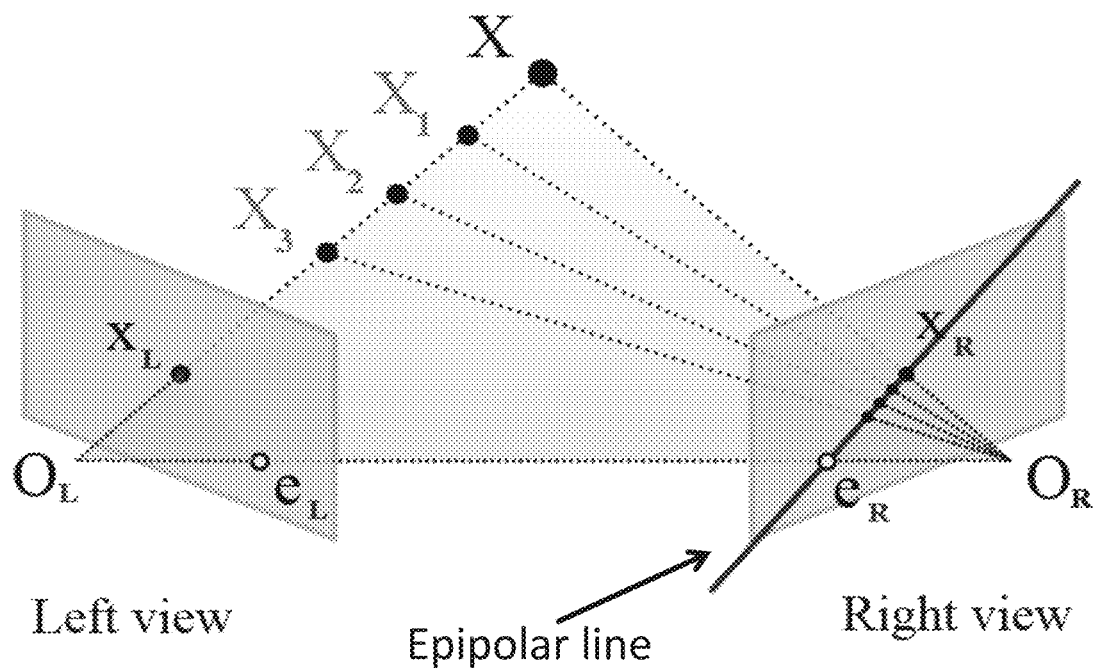

Krig, S., "Taxonomy of Feature Description Attributes", in Computer Vision Metrics, Springer, Berlin, Sep. 17, 2016, pp. 167-186.
Lazaros et al., "Review of Stereo Vision Algorithms: From Software to Hardware", International Journal of Optomechatronics, vol. 2, No. 4, Nov. 12, 2008, pp. 435-462.
Scharstein et al., "A Taxonomy and Evaluation of Dense Two-Frame Stereo Correspondence Algorithms", International Journal of Computer Vision, vol. 47, No. 1/2/3, Jan. 2002, pp. 7-42.
Hassaballah et al., "Image Features Detection, Description and Matching", Studies in Computational Intelligence, vol. 630, Feb. 23, 2016, pp. 11-45.
Shimizu et al., "An Analysis of Sub-Pixel Estimation Error on Area-Based Image Matching", 2002 14th International Conference on Digital Signal Processing (DSP), Santorini, Greece, Jul. 1, 2002, pp. 1239-1242.
Ma, W., "Extending Patchmatch Stereo to Multiple-view Case by Using Neighboring Images", 2016 International Conference on Information System and Artificial Intelligence (ISAI) Hong Kong, China, Jun. 24, 2016, pp. 45-49.
Hiradate et al., "An Extension of PatchMatch Stereo for 3D Reconstruction from Multi-View Images", 2015 3rd IAPR Asian Conference on Pattern Recognition (ACPR), Kuala Lumpur, Malasysia, Nov. 3, 2015, pp. 61-65.
Shen, S., "Accurate Multiple View 3D Reconstruction Using Patch-Based Stereo for Large-Scale Scenes", IEEE Transactions on Image Processing, vol. 22, No. 5, May 2013, pp. 1901-1914.
Furukawa et al., "Accurate, Dense, and Robust Multiview Stereopsis", IEEE Transactions on Pattern Analysis and Machine Intelligence, vol. 32, No. 8, Aug. 2010, pp. 1362-1376.
Lucas et al., "An Iterative Image Registration Technique with an Application to Stereo Vision", 7th Joint Conference on Artificial Intelligence (IJCAI), Vancouver, British Columbia, Canada, Aug. 24, 1981, pp. 674-679.

\* cited by examiner

METHOD AND APPARATUS FOR DEPTH-MAP ESTIMATION

1. REFERENCE TO RELATED EUROPEAN APPLICATION

This application claims priority from European Patent Application No. 17306936.0, entitled "METHOD AND APPARATUS FOR DEPTH-MAP ESTIMATION", filed on Dec. 27, 2017, the contents of which are hereby incorporated by reference in its entirety.

2. TECHNICAL FIELD

A method and an apparatus for depth-map estimation are disclosed.

3. BACKGROUND ART

Depth-map estimation is made with a pair of images obtained by two cameras for which precise location in space according to the so-called world coordinate system is known. A common method for estimating depth associated with a pixel of an image of a first camera is to find a corresponding pixel in an image of a second camera that best matches the pixel of the first image. Such matching is determined using similarity estimators such as a L1 or L2 norm computed between the two pixels.

However, when the similarity between two pixels is computed using only the color components of the pixels, such as the R,G, B components (for Red Green Blue), the depth estimation is very sensitive to noise.

To overcome this limitation, the similarity between two pixels may be computed using a patch of pixels surrounding the pixel being considered. This technique requires requires much more computation since it requires $T^2$ more computation for a patch of T×T pixels compared to computing similarity between 2 pixels.

This is a critical point for real-time estimation and especially when embedded into mobile devices.

Thus, there is a need for a new method for depth-map estimation that allows fast and accurate depth estimation.

3. SUMMARY

A method for depth-map estimation between at least two images respectively captured by at least two cameras is disclosed. The method for depth-map estimation comprises:
  obtaining extrinsic and intrinsic parameters of the at least two cameras,
  obtaining local spatial structure descriptors for each pixel of the at least two images, by transforming a patch of pixels surrounding each pixel,
  obtaining depth for at least one pixel of a first image among the at least two images, among at least two depth candidates, each depth candidate being associated with a corresponding pixel in a second image of the at least two images, said corresponding pixel in the second image being determined according to the obtained extrinsic and intrinsic parameters, wherein obtaining depth comprises:
    determining a similarity measure between the at least one pixel of the first image and each corresponding pixel in the second image, the similarity measure taking into account color components and local spatial structure descriptors of the corresponding pixel and the at least one pixel of the first image,
    selecting a pixel among the corresponding pixels in the second image that minimizes the similarity measure.

According to the present principle, depth for a pixel in an image is estimated by taking into account local spatial structure surrounding the pixel. Advantageously, local spatial structure descriptors can be determined ahead of depth estimation, for instance at the time images are captured by cameras.

According to an embodiment of the present principle, the number of local spatial structure descriptors obtained is lower than the number of pixels in the patch of pixels surrounding the pixel. According to this embodiment, comparing patches between two pixels necessitates less computation than in the prior art as fewer coefficients are used for describing a patch surrounding a pixel.

According to an embodiment of the present principle, transforming a patch of pixels surrounding each pixel further comprises:
  obtaining an auto-correlation matrice between the patch of pixels and surrounding patches,
  determining the local spatial structure descriptors for the pixel from the auto-correlation matrice.

According to this embodiment, the patch of pixels surrounding each pixel can be described by few components characterizing its correlation with surrounding patches.

According to an embodiment of the present principle, the local spatial structure descriptors are determined from a transformation of the auto-correlation matrice.

According to an embodiment of the present principle, the auto-correlation matrice is 3 by 3 array of scalars with a null coefficient at the center.

According to an embodiment of the present principle, the local spatial structure descriptors are obtained from the auto-correlation matrice using the following transformation:

$$I = \begin{pmatrix} a & b & c \\ h & 0 & d \\ g & f & e \end{pmatrix} \begin{vmatrix} 1 & 1 & 1 \\ 1 & 0 & 1 \\ 1 & 1 & 1 \end{vmatrix}, d_x = \begin{pmatrix} a & b & c \\ h & 0 & d \\ g & f & e \end{pmatrix} \begin{vmatrix} -1 & -1 & -1 \\ 1 & 0 & -1 \\ 1 & 1 & 1 \end{vmatrix},$$

$$d_y = \begin{pmatrix} a & b & c \\ h & 0 & d \\ g & f & e \end{pmatrix} \begin{vmatrix} 1 & 1 & -1 \\ 1 & 0 & -1 \\ 1 & -1 & -1 \end{vmatrix}, \Delta_x = \begin{pmatrix} a & b & c \\ h & 0 & d \\ g & f & e \end{pmatrix} \begin{vmatrix} -1 & -1 & 1 \\ 1 & 0 & 1 \\ 1 & -1 & -1 \end{vmatrix},$$

$$\Delta_y = \begin{pmatrix} a & b & c \\ h & 0 & d \\ g & f & e \end{pmatrix} \begin{vmatrix} 1 & -1 & -1 \\ 1 & 0 & 1 \\ -1 & -1 & 1 \end{vmatrix},$$

with a, b, c, d, e, f, g, h being coefficients of the auto-correlation matrice.

According to another embodiment of the present principle, the patch of pixels is transformed using a Discrete Cosine Transform. Such an embodiment allows to take advantage of the decorrelation feature of the DCT transform which allows to extract the frequencies of the patch surrounding the considered pixel.

According to an embodiment of the present principle, the patch of pixels is a patch of 8×8 pixels.

According to an embodiment of the present principle, the local spatial structure descriptors are selected among the Discrete Cosine Transform coefficients.

It should be noted that a step of obtaining an element/value in the present document can be viewed either as a step of reading such element/value in a memory unit of an electronic device or a step of receiving such element/value from another electronic device via communication means, or also a step of computing or determining such element/value via a processor of an electronic device.

According to another aspect of the disclosure, an apparatus for depth-map estimation between at least two images respectively captured by at least two cameras is disclosed. Such an apparatus comprises:

means for obtaining extrinsic and intrinsic parameters of the at least two cameras, means for obtaining local spatial structure descriptors for each pixel of the at least two images, comprising means for transforming a patch of pixels surrounding each pixel, means for obtaining depth for at least one pixel of a first image among the at least two images, among at least two depth candidates, each depth candidate being associated with a corresponding pixel in a second image of the at least two images, said corresponding pixel in the second image being determined according to the obtained extrinsic and intrinsic parameters, wherein said means for obtaining depth comprises:

means for determining a similarity measure between the at least one pixel of the first image and each corresponding pixel in the second image, the similarity measure taking into account color components and local spatial structure descriptors of the corresponding pixel and the at least one pixel of the first image, means for selecting a pixel among the corresponding pixels in the second image that minimizes the similarity measure.

According to an embodiment of the present principle, the means for transforming a patch of pixels surrounding each pixel comprises:

means for obtaining an auto-correlation matrice between the patch of pixels and surrounding patches, means for determining the local spatial structure descriptors for the pixel from the auto-correlation matrice.

According to another embodiment of the present principle, the patch of pixels is transformed using a Discrete Cosine Transform.

One or more of the present embodiments also provide a computer readable storage medium having stored thereon instructions for depth-map estimation, according to any one of the methods described above. The present embodiments also provide a computer program product including instructions for performing any one of the methods described.

4. BRIEF DESCRIPTION OF THE DRAWINGS

FIG. 1 illustrates projection of a 3D point X into a reference image of a first camera and into a second image of a second camera for depth-map estimation.

Figure 7:
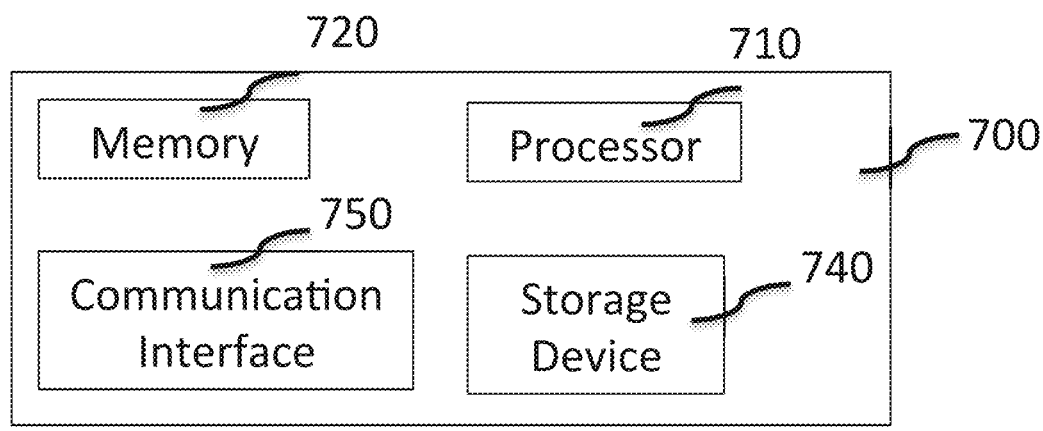
Figure 2:
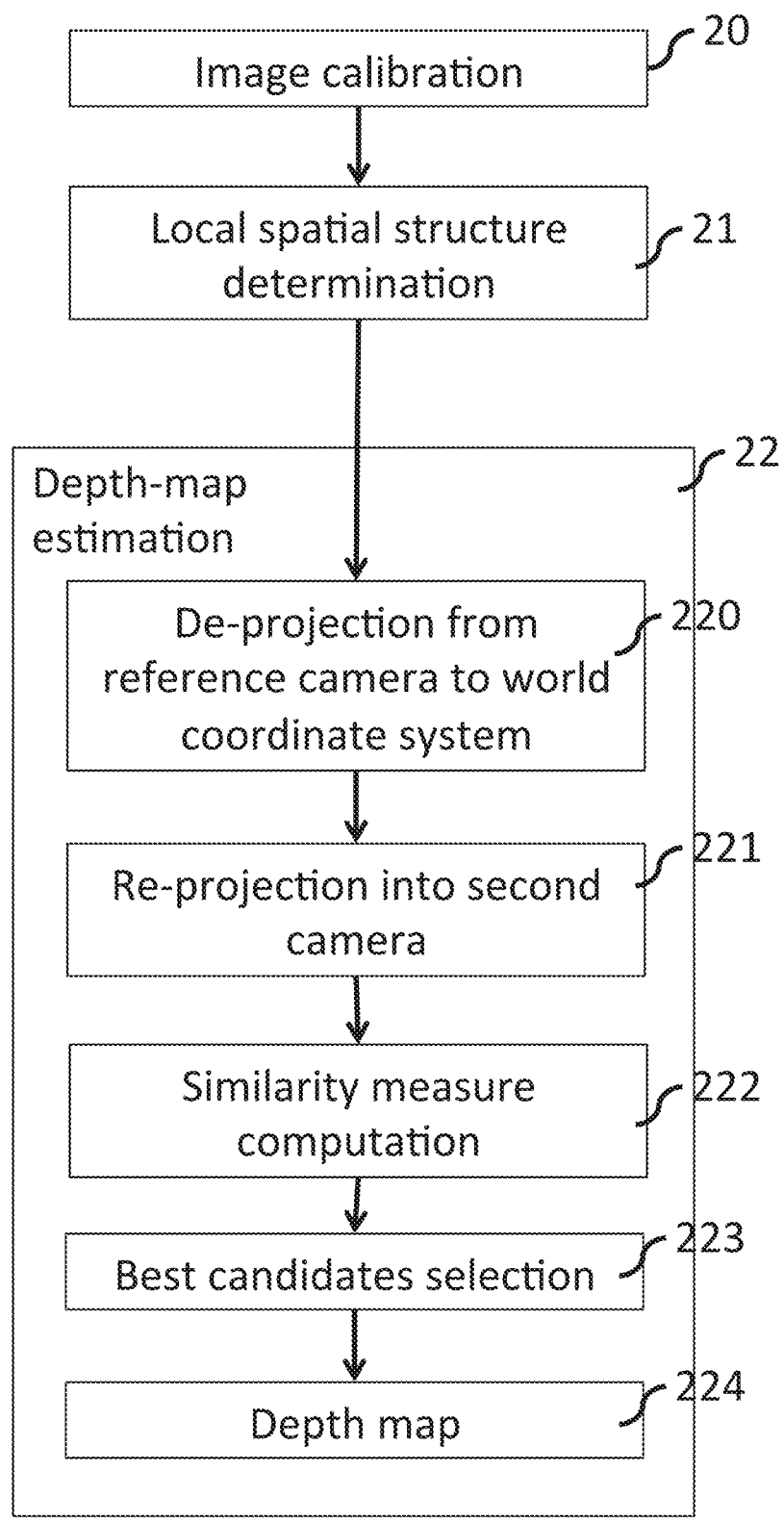
Figure 3:
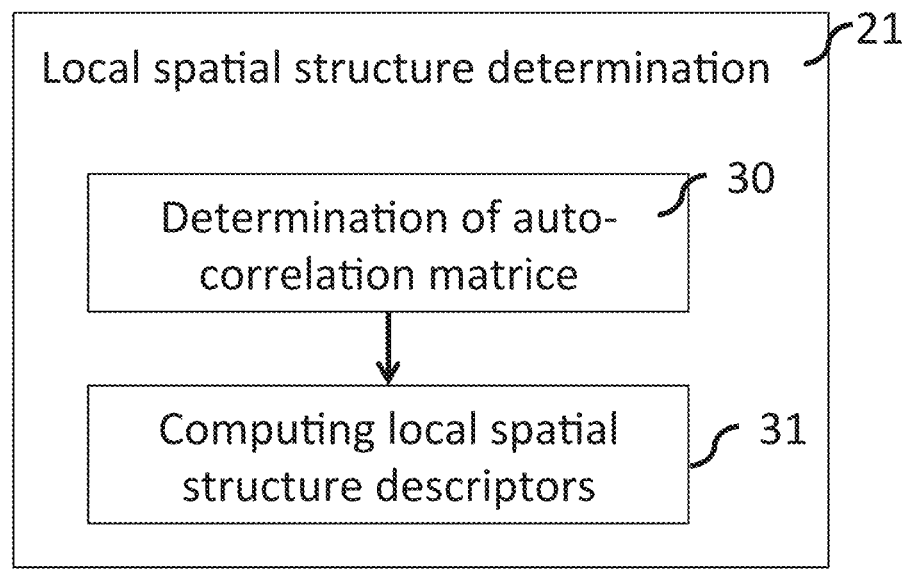
Figure 4:
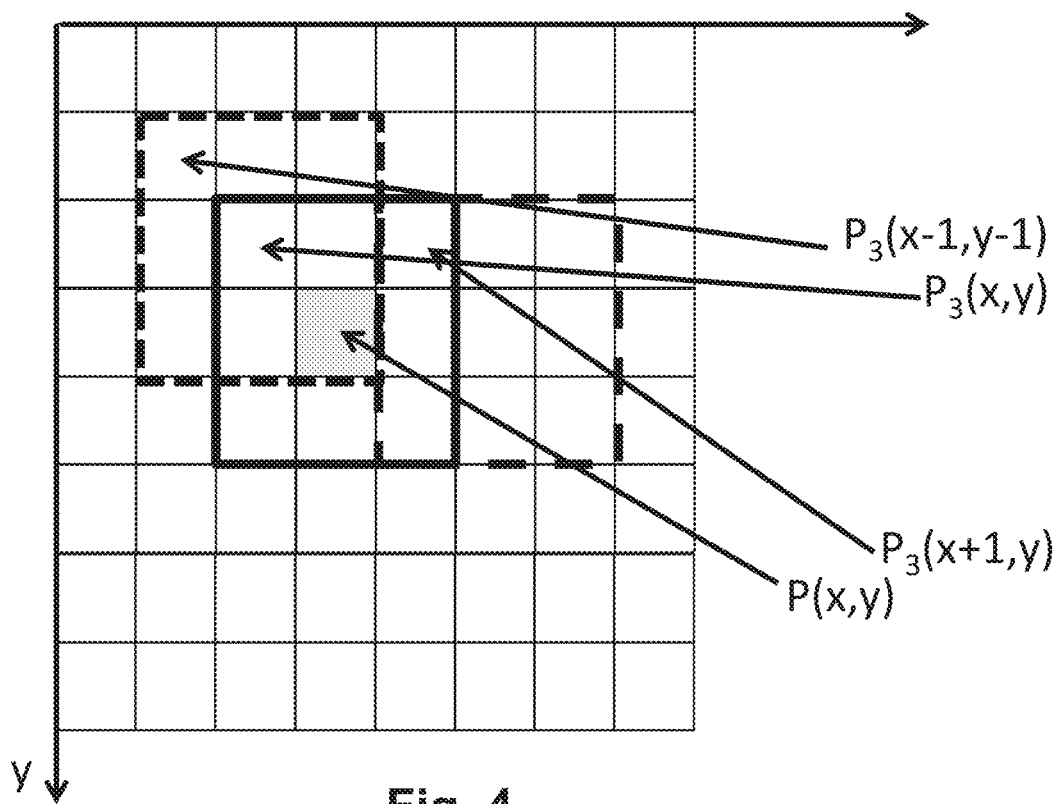
Figure 5:
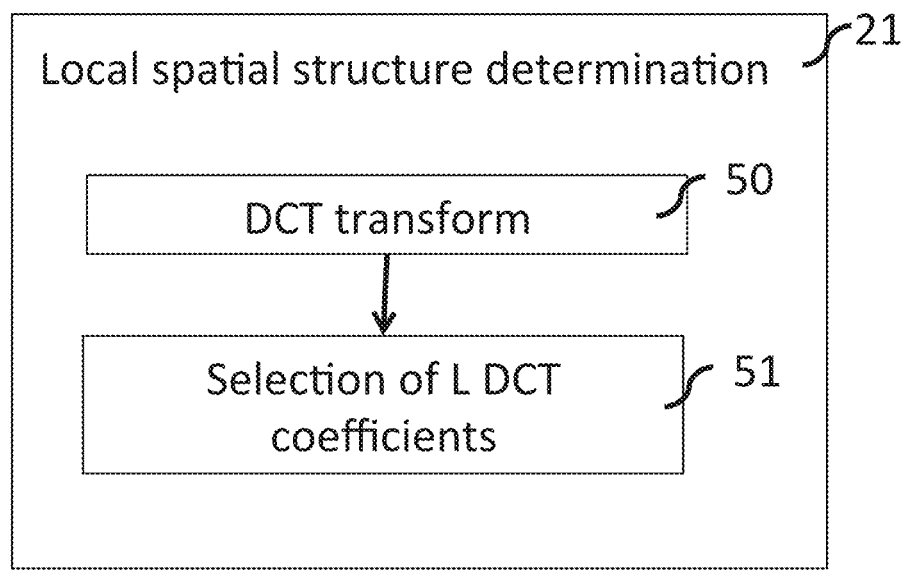
Figure 6:
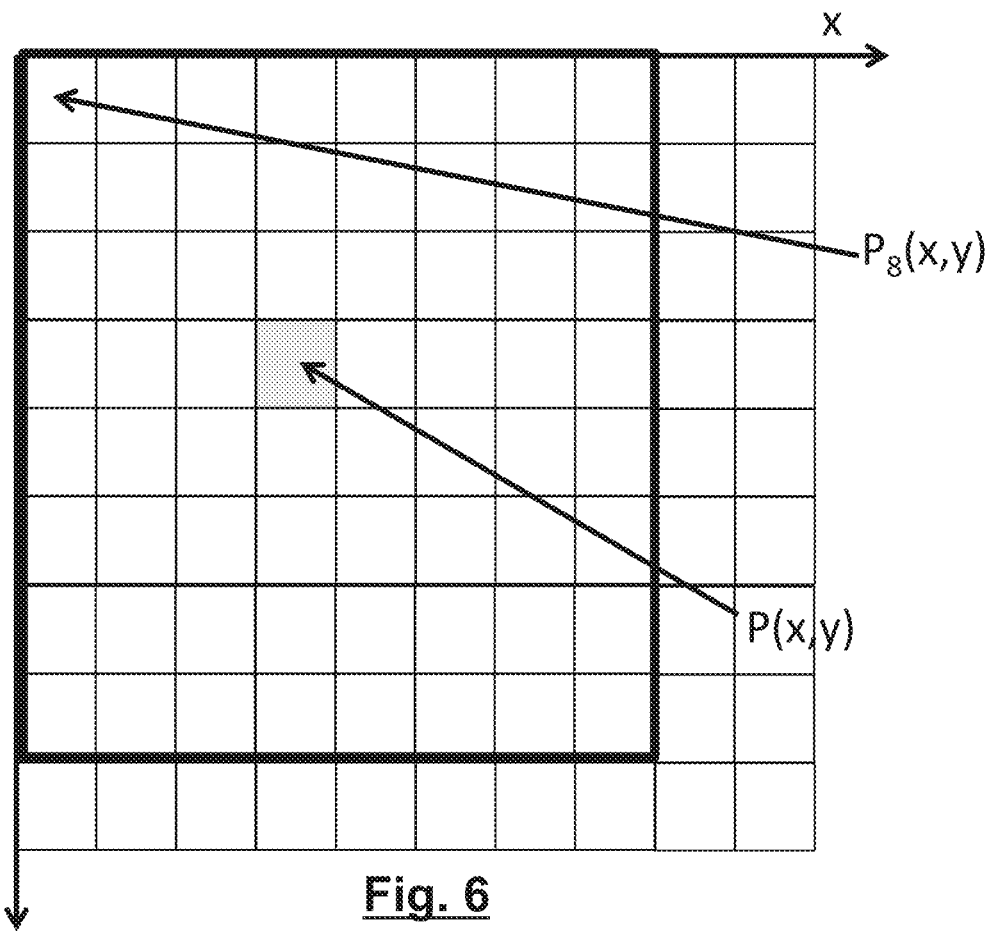

FIG. 2 illustrates an exemplary method for depth-map estimation according to an embodiment of the present principle, FIG. 3 illustrates an exemplary method for local spatial structure estimation according to an embodiment of the present principle, FIG. 4 illustrates exemplary patches used for local spatial structure estimation according to an embodiment of the present principle, FIG. 5 illustrates an exemplary method for local spatial structure estimation according to another embodiment of the present principle, FIG. 6 illustrates an exemplary patch used for local spatial structure estimation according to another embodiment of the present principle, FIG. 7 illustrates an exemplary apparatus for depth-map estimation according to an embodiment of the present disclosure.

5. DESCRIPTION OF EMBODIMENTS

An exemplary method for depth-map estimation is disclosed herein in reference to FIG. 2.

Depth estimation is made with a pair of images. The pair of images can be obtained from a stereo camera having a left view and a right view or from an array of cameras, considering at least 2 cameras. Depth estimation is made possible if the 2 cameras are precisely located in space according to the so-called world coordinate system.

In step 20, the 2 cameras are located in space using a camera calibration procedure which for instance uses a chessboard observed at different positions from the 2 cameras. Several pictures are taken with the chessboard positioned at different positions from the cameras. On each picture, the 2D coordinate of the corners delimited by 2 black and 2 white squares of the chessboard are extracted. The 2D coordinates of the corners are associated with the 2D coordinates of the same corners observed by the second camera.

Having all the couple of 2D coordinates of corners observed by the 2 cameras and also for the different exposures, it is possible to estimate the position of the cameras according to a world coordinate system. In this system, the center of the entry pupil of the camera i is positioned in space by a translation vector $T_i=(X,Y,Z)^t$, and the optical axis is defined by a 3D rotation matrix $R_i$. The pose matrix of the camera i is defined by $P_i=(R_i\ T_i)\in \mathbb{R}_{3\times 4}$. The extrinsic matrix of the camera i is defined by $Q_i=(R_i^{-1}-R_i^{-1}.T_i)\in \mathbb{R}_{3\times 4}$. From the camera calibration at step 20, the so-called extrinsic camera parameters (a translation vector T and a rotation matrix R) are deduced. Such extrinsic parameters allow to convert a 3D world coordinate into a 2D camera coordinate.

Now, we describe in reference with FIG. 1, a method for estimating depth of a 3D point in space. Let $x_L(x, y)$ being the pixel from the left camera which observes the object in space at X(X,Y,Z). $O_L$ is the optical center of the left camera. Any object $X_i$ which lies on the line $(O_L, X)$ is observed by the left camera at the same pixel $x_L$. On the right camera, object $X_i$ are observed at coordinates $x_r$ which all lie on one line on the sensor, the so-called epipolar line.

A common method for estimating the depth associated with a pixel is made using the epipolar line.

One considers one pixel $p_{ref}(x, y)$ of the reference camera at pixel coordinate (x, y). The pixel $p_{ref}$ is de-projected into the world coordinate system at various distance candidates $Z_c$ with the rotation and translation matrix associated with the reference camera. The minimum and maximum values for $Z_c$ are selected depending on the nearest and farthest objects lying in the scene. The interval between these two values is cut linearly into N slices which defines the N distance candidate $Z_c$.

The number of slices depends on the desired speed and accuracy of the depth-estimation process. For instance, between 30 and 150 slices may be used.

Several 3D points in the world coordinate system are thus obtained at coordinates $P_{ref}(X_c,Y_c,Z_c)$. All these 3D points $P_{ref}(X_c,Y_c, Z_c)$ are all observed by the pixel $P_{ref}(x, y)$ in the image of the reference camera.

For instance, a number N of candidates are evaluated. An exemplary method for depth estimation is given in B. D. Lucas, T. Kanade, et al. "*An iterative image registration*

*technique with an application to stereo vision"*, in *DARPA Image Understanding Workshop*, Vancouver, BC, Canada, 1981. For instance, N is equal to 100 for a good depth estimation. The number N is also named the number of slices, as the candidates $Z_c$ define planes which cut the 3D space in parallel slices where depth-map is estimated.

The obtained candidates $P_{ref}$ are then projected into the second camera according to the extrinsic and intrasic camera parameters. One deduces N coordinates $P_{sec}(x_{Z_c}, y_{Z_c})$ on the second camera which all depends on the distance candidate Z.

The distance $Z_{p_{ref}}$ of the real physical object $P_{ref}$ observed at pixel $p_{ref}$ on the reference camera is equal to the distance candidate $Z_c$ for which $p_{ref}(x, y)$ is the most similar to $p_{sec}(x_{Z_c}, y_{Z_c})$. Such similarity may be computed using various estimators. For instance, an L1 norm computed between 2 pixels may be used.

If the pixel p being observed is a color pixel defined by 3 scalars corresponding to the 3 color components Red, Green and Blue ($p_R$, $p_G$, $p_B$). The L1 norm between 2 pixels $p_{ref}(x, y)$ and $p_{sec}(x_{Z_c}, y_{Z_c})$ is defined by $s_{L1}(p_{ref}(x, y), p_{sec}(x_{Z_c}, y_{Z_c}))=|p_{ref,R}(x, y)-p_{sec,R}(x_{Z_c}, y_{Z_c})|+|p_{ref,G}(x, y)-p_{sec,G}(x_{Z_c}, y_{Z_c})|+|p_{ref,B}(x, y)-p_{secB}(x_{Z_c}, y_{Z_c})|$. From the N candidates $p_{sec}(x_{Z_c}, y_{Z_c})$, the pixel having the smallest L1 norm with $p_{ref}(x, y)$ is said to observe to same object in space. The estimated depth of the pixel $p_{ref}$ is thus the candidate $Z_c$ corresponding to the candidate $p_{sec}(x_{Z_c},y_{Z_c})$ having the smallest L1 norm with $p_{ref}(x, y)$.

According to another example, an L2 norm computed between 2 pixels may be used. The L2 norm is similar to the L1 norm except that the similarity measure is defined by $s_{L2}(p_{ref}, p_{sec})=|p_{ref,R}-p_{sec,R}|^2+|p_{ref,G}-p_{sec,G}|^2+|p_{ref,B}-p_{sec,b}|^2$. In practice if the similarity is estimated only with the color component of one pixel, the depth estimation is very sensitive to noise. To overcome this limitation the similarity between 2 pixels may be computed using a patch of few surrounding pixels. This technique refers to cross-patch depth-estimation.

Obviously, such a method requires much more computation since for each candidate, similarity measure has to be computed between patches of T×T pixels. Therefore, the method requires $T^2$ more computation for a patch of T×T pixels compared to similarity measured between only 2 pixels. This is a critical point for real time estimation and especially when embedded into mobile devices.

The similarity operator described above (L1 and L2 norms) may be used for patches surrounding a pixel.
The L1 norm computed between 2 patches may be computed as follows. Let $P_{ref,T}(x, y)$ being a T by T pixels patch surrounding the pixel $p_{ref}(x, y)$ and respectively let $P_{sec,T}(x_{Z_c}, y_{Z_c})$ being a T by T pixels patch surrounding the pixel $p_{sec}(x_{Z_c}, y_{Z_c})$. The L1 norm between the 2 patches is defined by $S_{L1}(P_{ref,T}, P_{sec,T})=\Sigma_{k=-T/2}^{k=T/2}\Sigma_{l=-T/2}^{l=T/2} s_{L1}(p_{ref}(x-k, y-l), p_{sec}(s_{Z_c}-k, y_{Z_c}-l))$. From the N candidates $p_{sec}(x_{Z_c},y_{Z_c})$, the one having the smallest L1 norm with $p_{ref}(x, y)$ is said to observe to same object in space. The corresponding $Z_c$ is the depth estimation associated with pixel $p_{ref}(x, y)$.

Similarity estimators which use patches allow more accurate depth estimation but with a higher computational cost. The use of patches for similarity estimation between the 2 pixels ($p_{ref}$ and $p_{sec}$), allows to take into account the local spatial structure of the pixels being compared, by computing the similarity measure on the color components of the surrounding pixels. The use of patches prevents for instance to estimate that 2 pixels are similar if they have the same color ($p_{ref}(x, y) \approx p_{sec}(x, y)$), but having different spatial structure (one pixel is lying on an edge and the other one on a flat area for instance). Only patches permit to discriminate pixels considering the underlying spatial structures around the pixels.

According to the principle disclosed herein, depth-map is estimated taking into account of local spatial structure. According to an embodiment of the present principle, local spatial structure of a pixel is determined ahead of the depth-map estimation by determining characteristics of a patch surrounding the pixel, also called local spatial structure descriptors. Back to FIG. 2, in step 21, local spatial structure of each pixel of the 2 images is determined. Embodiments for such determination are further discussed in reference with FIGS. 3-6. According to the present principle, local spatial structure descriptors are determined for each pixel of the two images, by transforming a patch of T by T pixels surrounding each pixel. According to the present principle, the number L of local spatial structure descriptors determined at step 21 from the patch surrounding each pixel is lower than the number of pixels in the patch. In this way, the similarity measure computation necessitates less computation than in the prior art because fewer coefficients are used for describing a patch surrounding a pixel.

For each pixel of the 2 images to be compared, the L local structure descriptors determined are stick to the 3 scalars corresponding to the 3 color components of each pixel. One derives 2 new special images where each pixel is made of L+3 components.

In step 22, depth is estimated for each pixel $p_{ref}(x, y)$ of the reference image in a way similar as the one disclosed above.

More particularly, in step 220, the 2D pixel coordinate $p_{ref}(x, y)$ is de-projected into 3D coordinates $P(X_c, Y_c, Z_c)$ in the world coordinate system for N candidates $Z_c$ according to the extrinsic parameters of the reference camera.

In step 221, the N 3D coordinates candidates $P(X_c, Y_c, Z_c)$ are projected into the 2D coordinates $p_{sec}(x_{Z_c}, y_{Z_c})$ of the second camera according to the extrinsic parameter of the second camera.

In step 222, the similarity measure is computed between the reference pixel $p_{ref}(x, y)$ and each of the pixel candidate $p_{sec}(x_{Z_c}, y_{Z_c})$. The similarity is computed using the L local spatial structure descriptors determined at step 21 and the 3 color components of the pixels $p_{ref}(x, y)$ and $p_{sec}(x_{Z_c}, y_{Z_c})$. For instance, if the L1 norm is used, the similarity measure is computed as $s_{L1}(p_{ref}(x, y), p_{sec}(x_{Z_c}, y_{Z_c}))=\Sigma_{k=1}^{k=L+3}|p_{ref}(x, y,k)-p_{sec}(x, y,k)|$ where $k \in [1, L+3]$ is the is $k^{th}$ component of the pixels, the components of a pixel being given by the 3 color components of the pixel and the L local spatial structure descriptors determined at step 21.

In step 223, the similarity measures computed at step 222 are compared and the pixel $p_{sec}(x_{Z_c},y_{Z_c})$ that minimizes the similarity measure is selected as the best candidate. That is the best candidates c is selected if $p_{ref}(x, y)$ is the most similar to $p_{sec}(x_{Z_c}, y_{Z_c})$. In step 224, the depth associated with the pixel coordinate $p_{ref}(x, y)$ is equal to the distance $Z_c$ of the best candidate c.

According to the present principle, the method for depth-map estimation allows to describe the patches surrounding the pixels to be compared with few coefficients such that comparing 2 patches requires less computation. Furthermore, the local spatial structure of the patches can be estimated per pixel prior to the depth-estimation.

A method for local spatial structure estimation of a pixel is disclosed below in reference with FIGS. 3 and 4 according to an embodiment of the present disclosure. According to the embodiment disclosed herein, local spatial structure descriptors are computed for describing a patch of 3×3 pixels $P_3(x, y)$ surrounding the pixel $P(x, y)$ such as disclosed in FIG. 4.

The patch $P_3(x, y)$ is characterized by estimating the L1-norm $L(i,j)$ between $P_3(x, y)$ and the 3×3 surrounding patches $P_3(x-i-1, y-j-1)$ with $(i,j) \in [0,2]^2$. FIG. 4 illustrates in bolded lines the central patch $P_3(x, y)$ surrounding pixel $P(x, y)$ (in grey on FIG. 4), and 2 patches $P_3(x-1, y-1)$ and $P_3(x+1, y)$ in dotted lines. In step 30, an auto-correlation matrice n is determined between the central patch $P_3(x, y)$ and the surrounding 3×3 patches as follows:

$$L(i, j) = \sum_{k=-1}^{k=1} \sum_{l=-1}^{l=1} s_{L1}(p(x-k, y-l), p(x-k-i+1, y-l-j+1)) \quad (1)$$

$L(i,j)$ is a 3 by 3 array of scalars with a null coefficient in the middle. The 8 other coefficients depend on the local spatial structures of the 3×3 pixels around $p(x, y)$. In step 31, 5 local spatial structure descriptors are then computed from the auto-correlation matrice. According to the embodiment disclosed herein, the 8 coefficients of the auto-correlation matrice are compressed into 5 coefficients following the transformation given below:

$$I = \left\langle \begin{matrix} a & b & c \\ h & 0 & d \\ g & f & e \end{matrix} \middle| \begin{matrix} 1 & 1 & 1 \\ 1 & 0 & 1 \\ 1 & 1 & 1 \end{matrix} \right\rangle = a+b+c+d+e+f+g+h \quad (2)$$

$$d_x = \left\langle \begin{matrix} a & b & c \\ h & 0 & d \\ g & f & e \end{matrix} \middle| \begin{matrix} -1 & -1 & -1 \\ 1 & 0 & -1 \\ 1 & 1 & 1 \end{matrix} \right\rangle = -a-b-c-d+e+f+g+h$$

$$d_y = \left\langle \begin{matrix} a & b & c \\ h & 0 & d \\ g & f & e \end{matrix} \middle| \begin{matrix} 1 & 1 & -1 \\ 1 & 0 & -1 \\ 1 & -1 & -1 \end{matrix} \right\rangle = a+b-c-d-e-f+g+h$$

$$\Delta_x = \left\langle \begin{matrix} a & b & c \\ h & 0 & d \\ g & f & e \end{matrix} \middle| \begin{matrix} -1 & -1 & 1 \\ 1 & 0 & 1 \\ 1 & -1 & -1 \end{matrix} \right\rangle = -a-b+c+d-e-f+g+h$$

$$\Delta_y = \left\langle \begin{matrix} a & b & c \\ h & 0 & d \\ g & f & e \end{matrix} \middle| \begin{matrix} 1 & -1 & -1 \\ 1 & 0 & 1 \\ -1 & -1 & 1 \end{matrix} \right\rangle = a-b-c+d+e-f-g+h$$

where a,b,c,d,e,f,g,h are the 8 coefficients of the array $L(i, j)$.

The scalar I represents how the 8 pixels are similar: I is close to 0 for flat areas, and I has high values for textured areas.

The 2 scalars $(d_x, d_y)$ represent the asymmetry of the array L. The values are close to 0 for pixels belonging to flat area. The values become positives and negatives on both side of an edge with an intensity which depends on the contrast of the edge.

The 2 scalars $(\Delta_x, \Delta_y)$ represent the orientation of an edge if any.

The 5 scalars $(I, d_x, d_y, \Delta_x, \Delta_y)$ permit to describe the local spatial structure for the pixel $p(x, y)$.

The original images are made of 3 scalars per pixel corresponding to the 3 color components. With the local spatial structure estimation disclosed above, one adds 5 components to describe a pixel. For each pixel of the input image, one forms a new image where each pixels is made of 8 components [R; G; B; $s_I I$; $s_d d_x$; $s_d d_y$; $s_\Delta \Delta_x$; $s_\Delta \Delta_y$], where $s_I$, $s_d$, $s_\Delta$ are 3 scale-factors which controls the amplitude of the 5 scalars versus the 3 color components.

A method for local spatial structure estimation of a pixel is disclosed below in reference with FIGS. 5 and 6 according to another embodiment of the present disclosure.

According to the embodiment disclosed herein, local spatial structure descriptors are computed for describing a patch of 8×8 pixels $P_8(x, y)$ surrounding the pixel $P(x, y)$ such as disclosed in FIG. 6.

In the embodiment disclosed herein, the local spatial descriptor are based on the Discrete Cosine Transform (DCT) computed on a patch of 8×8 pixels $P_8(x, y)$ surrounding a pixel $P(x, y)$ as illustrated in FIG. 6. The DCT transform allows to extract the frequencies which lies within a patch of 8 by 8 pixels. Selecting some coefficients provided by the DCT transform allows to characterize the shape of the patch surrounding the pixel $P(x, y)$. In step 50, DCT transform is applied on the patch $P_8(x, y)$ surrounding the pixel $P(x, y)$. The 8×8 DCT $(u, v)$ coefficients with $(u, v) \in [0,8[^2$ are computed as follows:

$$DCT(u, v) = \sum_{i=0}^{7} \sum_{j=0}^{7} p(x+i-3, y+j-3) \cos\left[\frac{(2x+1)u\pi}{16}\right] \cos\left[\frac{(2y+1)v\pi}{16}\right] \quad (3)$$

For each pixel $p(x, y)$, 64 values of the DCT $(u, v)$ are obtained.

In step 51, L characteristics associated with the pixel $P(x, y)$ are selected from these 64 values. Several selections can be used.

For example, with L=5, the selected DCT values are: DCT(0,0), DCT(0,1), DCT(0,2), DCT(1,0), and DCT(2,0).

According to another example, with L=6, the selected DCT values are the coefficients $(u, v)$ such that u+v<3: DCT(0,0), DCT(0,1), DCT(0,2), DCT(1,0), DCT(1,1) and DCT(2,0). According to yet another example, with L=10, the selected DCT values are the coefficients $(u, v)$ such that u+v<4: DCT(0,0), DCT(0,1), DCT(0,2), DCT (0,3), DCT (1,0), DCT(1,1), DCT (1,2), DCT(2,0), DCT(2,1) and DCT (3,0). Using L=10 provides an accurate spatial descriptor with only 10 coefficients per pixel compared to the 64 values of the DCT.

The original images are made of 3 scalars per pixel corresponding to the 3 color components. With the local spatial structure estimation, one adds L components to describe a pixel. For each pixel of the input image, one forms a new image where each pixels is made of (3+L) components [R; G; B; and the L selected DCT coefficients]. The selected DCT coefficients may be scaled by a scale factor $s_{DCT}$ that controls the amplitude of the L scalars versus the 3 color components.

FIG. 7 illustrates an exemplary apparatus for depth-map estimation according to an embodiment of the present disclosure. FIG. 7 illustrates a block diagram of an exemplary system 700 in which various aspects of the exemplary embodiments may be implemented. The system 700 may be embodied as a device including the various components described below and is configured to perform the processes described above. Examples of such devices, include, but are not limited to, mobile devices, personal computers, laptop computers, smartphones, tablet computers, digital multimedia set top boxes, digital television receivers, personal video recording systems, connected home appliances, and servers.

The system 700 may be communicatively coupled to other similar systems, and to a display via a communication channel.

Various embodiments of the system 700 include at least one processor 710 configured to execute instructions loaded therein for implementing the various processes as discussed above. The processor 710 may include embedded memory, input output interface, and various other circuitries as known in the art. The system 700 may also include at least one memory 720 (e.g., a volatile memory device, a non-volatile memory device). The system 700 may additionally include a storage device 740, which may include non-volatile memory, including, but not limited to, EEPROM, ROM, PROM, RAM, DRAM, SRAM, flash, magnetic disk drive, and/or optical disk drive. The storage device 740 may comprise an internal storage device, an attached storage device, and/or a network accessible storage device, as non-limiting examples.

Program code to be loaded onto one or more processors 710 to perform the various processes described hereinabove may be stored in the storage device 740 and subsequently loaded onto the memory 720 for execution by the processors 710. In accordance with the exemplary embodiments, one or more of the processor(s) 710, the memory 720, and the storage device 740, may store one or more of the various items during the performance of the processes discussed herein above, including, but not limited to the input images, the output depth-maps, equations, formulas, matrices, variables, operations, and operational logic. The system 700 may also include a communication interface 750 that enables communication with other devices via a communication channel. The communication interface 750 may include, but is not limited to a transceiver configured to transmit and receive data from the communication channel. The communication interface 750 may include, but is not limited to, a modem or network card and the communication channel 750 may be implemented within a wired and/or wireless medium. The various components of the system 700 may be connected or communicatively coupled together (not shown) using various suitable connections, including, but not limited to internal buses, wires, and printed circuit boards.

The exemplary embodiments may be carried out by computer software implemented by the processor 710 or by hardware, or by a combination of hardware and software. As a non-limiting example, the exemplary embodiments may be implemented by one or more integrated circuits. The memory 720 may be of any type appropriate to the technical environment and may be implemented using any appropriate data storage technology, such as optical memory devices, magnetic memory devices, semiconductor-based memory devices, fixed memory, and removable memory, as non-limiting examples. The processor 710 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

The invention claimed is:

1. A method comprising:
obtaining a number of local spatial structure descriptors for each pixel of at least two images, wherein the number of local spatial structure descriptors is lower than a number of pixels in a patch of pixels surrounding each pixel, by transforming the patch of pixels surrounding each pixel, wherein the at least two images are respectively captured by at least two cameras; and
obtaining depth for at least one pixel of a first image of the at least two images, from among at least two depth candidates, each depth candidate being associated with a corresponding pixel in a second image of the at least two images, the corresponding pixel in the second image being obtained according to extrinsic and intrinsic parameters of the at least two cameras, wherein obtaining depth comprises selecting a pixel from among the corresponding pixels in the second image, which pixel minimizes a similarity measure determined between the at least one pixel of the first image and each corresponding pixel in the second image, the similarity measure taking into account color components and local spatial structure descriptors of the corresponding pixel and the at least one pixel of the first image.

2. The method according to claim 1, wherein transforming the patch of pixels surrounding each pixel further comprises:
obtaining an auto-correlation matrix between the patch of pixels and surrounding patches; and
determining the local spatial structure descriptors for each pixel from the auto-correlation matrix.

3. The method according to claim 2, wherein the local spatial structure descriptors are determined from a transformation of the auto-correlation matrix.

4. The method according to claim 3, wherein the auto-correlation matrix is a 3-by-3 array of scalars with a null coefficient at the center and other coefficients depending on the local spatial structure of patches of pixels surrounding each pixel.

5. The method according to claim 3, wherein the local spatial structure descriptors are obtained from the auto-correlation matrix using the following transformation:

$$I = \begin{pmatrix} a & b & c \\ h & 0 & d \\ g & f & e \end{pmatrix} \begin{vmatrix} 1 & 1 & 1 \\ 1 & 0 & 1 \\ 1 & 1 & 1 \end{vmatrix}, d_x = \begin{pmatrix} a & b & c \\ h & 0 & d \\ g & f & e \end{pmatrix} \begin{vmatrix} -1 & -1 & -1 \\ 1 & 0 & -1 \\ 1 & 1 & 1 \end{vmatrix},$$

$$d_y = \begin{pmatrix} a & b & c \\ h & 0 & d \\ g & f & e \end{pmatrix} \begin{vmatrix} 1 & 1 & -1 \\ 1 & 0 & -1 \\ 1 & -1 & -1 \end{vmatrix}, \Delta_x = \begin{pmatrix} a & b & c \\ h & 0 & d \\ g & f & e \end{pmatrix} \begin{vmatrix} -1 & -1 & 1 \\ 1 & 0 & 1 \\ 1 & -1 & -1 \end{vmatrix},$$

$$\Delta_y = \begin{pmatrix} a & b & c \\ h & 0 & d \\ g & f & e \end{pmatrix} \begin{vmatrix} 1 & -1 & -1 \\ 1 & 0 & 1 \\ -1 & -1 & 1 \end{vmatrix},$$

where a, b, c, d, e, f, g, h are coefficients of the auto-correlation matrix, where I represents how pixels of the patch surrounding the pixel are similar, where $d_x, d_y$ represents asymmetry of the auto-correlation matrix, where $\Delta_x$, $\Delta_y$ represents a potential orientation of an edge, and where I, $d_x$, $d_y$, $\Delta_x$, $\Delta_y$ are local spatial structure descriptors for a pixel p(x,y).

6. The method according to claim 1, wherein the patch of pixels is transformed using a Discrete Cosine Transform.

7. The method according to claim 6, wherein the patch of pixels is a patch of 8×8 pixels.

8. The method according to claim 6, wherein the local spatial structure descriptors are selected from among the Discrete Cosine Transform coefficients.

9. An apparatus comprising a processor configured to:
obtain a number of local spatial structure descriptors for each pixel of at least two images, wherein the number of local spatial structure descriptors is lower than a number of pixels in a patch of pixels surrounding each pixel, by transforming the patch of pixels surrounding each pixel, wherein the at least two images are respectively captured by at least two cameras; and
obtain depth for at least one pixel of a first image of the at least two images, from among at least two depth candidates, each depth candidate being associated with a corresponding pixel in a second image of the at least two images, the corresponding pixel in the second image being obtained according to extrinsic and intrinsic parameters of the at least two cameras, wherein the depth is obtained by selecting a pixel from among the corresponding pixels in the second image, which pixel minimizes a similarity measure between the at least one pixel of the first image and each corresponding pixel in the second image, the similarity measure taking into account color components and local spatial structure descriptors of the corresponding pixel and the at least one pixel of the first image.

10. The apparatus according to claim 9, wherein the patch of pixels surrounding each pixel is transformed by:
obtaining an auto-correlation matrix between the patch of pixels and surrounding patches; and
determining the local spatial structure descriptors for each pixel from the auto-correlation matrix.

11. The apparatus according to claim 10, wherein the local spatial structure descriptors are determined from a transformation of the auto-correlation matrix.

12. The apparatus according to claim 11, wherein the auto-correlation matrix is 3-by-3 array of scalars with a null coefficient at the center and other coefficients depending on the local spatial structure of patches of pixels surrounding each pixel.

13. The apparatus according to claim 11, wherein the local spatial structure descriptors are obtained from the auto-correlation matrix using the following transformation:

$$I = \begin{pmatrix} a & b & c \\ h & 0 & d \\ g & f & e \end{pmatrix} \begin{pmatrix} 1 & 1 & 1 \\ 1 & 0 & 1 \\ 1 & 1 & 1 \end{pmatrix},$$

$$d_x = \begin{pmatrix} a & b & c \\ h & 0 & d \\ g & f & e \end{pmatrix} \begin{pmatrix} -1 & -1 & -1 \\ 1 & 0 & -1 \\ 1 & 1 & 1 \end{pmatrix},$$

$$d_y = \begin{pmatrix} a & b & c \\ h & 0 & d \\ g & f & e \end{pmatrix} \begin{pmatrix} 1 & 1 & -1 \\ 1 & 0 & -1 \\ 1 & -1 & -1 \end{pmatrix},$$

$$\Delta_x = \begin{pmatrix} a & b & c \\ h & 0 & d \\ g & f & e \end{pmatrix} \begin{pmatrix} -1 & -1 & 1 \\ 1 & 0 & 1 \\ 1 & -1 & -1 \end{pmatrix},$$

$$\Delta_y = \begin{pmatrix} a & b & c \\ h & 0 & d \\ g & f & e \end{pmatrix} \begin{pmatrix} 1 & -1 & -1 \\ 1 & 0 & 1 \\ -1 & -1 & 1 \end{pmatrix},$$

where a, b, c, d, e, f, g, h are coefficients of the auto-correlation matrix, where I represents how pixels of the patch surrounding the pixel are similar, where $d_x$, $d_y$ represents asymmetry of the auto-correlation matrix, where $\Delta_x$, $\Delta_y$ represents a potential orientation of an edge, and where I, $d_x$, $d_y$, $\Delta_x$, $\Delta_y$ are local spatial structure descriptors for a pixel p(x, y).

14. The apparatus according to claim 9, wherein the patch of pixels is transformed using a Discrete Cosine Transform.

15. The apparatus according to claim 14, wherein the patch of pixels is a patch of 8×8 pixels.

16. The apparatus according to claim 14, wherein the local spatial structure descriptors are selected from among the Discrete Cosine Transform coefficients.

17. A non-transitory processor-readable medium having stored instructions that cause a processor to perform:
obtaining a number of local spatial structure descriptors for each pixel of at least two images, wherein the number of local spatial structure descriptors is lower than a number of pixels in a patch of pixels surrounding each pixel, by transforming the patch of pixels surrounding each pixel, wherein the at least two images are respectively captured by at least two cameras; and
obtaining depth for at least one pixel of a first image of the at least two images, from among at least two depth candidates, each depth candidate being associated with a corresponding pixel in a second image of the at least two images, the corresponding pixel in the second image being obtained according to extrinsic and intrinsic parameters of the at least two cameras, wherein obtaining depth comprises selecting a pixel from among the corresponding pixels in the second image, which pixel minimizes a similarity measure determined between the at least one pixel of the first image and each corresponding pixel in the second image, the similarity measure taking into account color components and local spatial structure descriptors of the corresponding pixel and the at least one pixel of the first image.

* * * * *

UNITED STATES PATENT AND TRADEMARK OFFICE
CERTIFICATE OF CORRECTION

PATENT NO. : 10,937,180 B2
APPLICATION NO. : 16/233603
DATED : March 2, 2021
INVENTOR(S) : Frederic Babon, Benoit Vandame and Guillaume Boisson It is certified that error appears in the above-identified patent and that said Letters Patent is hereby corrected as shown below:

On the Title Page

Item (56) OTHER PUBLICATIONS, Line 1: replace "Algortihms:" with --Algorithms:--

In the Claims

Claim 5, Column 10, Line 66: replace "where/represents" with --where $I$ represents--

Signed and Sealed this
Thirtieth Day of August, 2022

Katherine Kelly Vidal
*Director of the United States Patent and Trademark Office*